Oct. 16, 1923. 1,471,070
M. R. SHAW
RUBBER TIRE
Filed Oct. 26, 1920
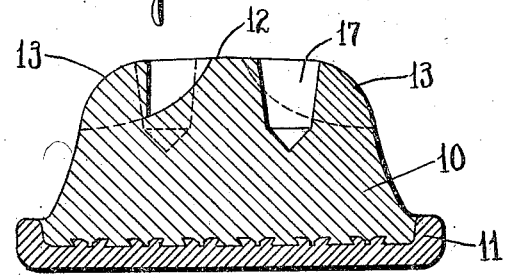
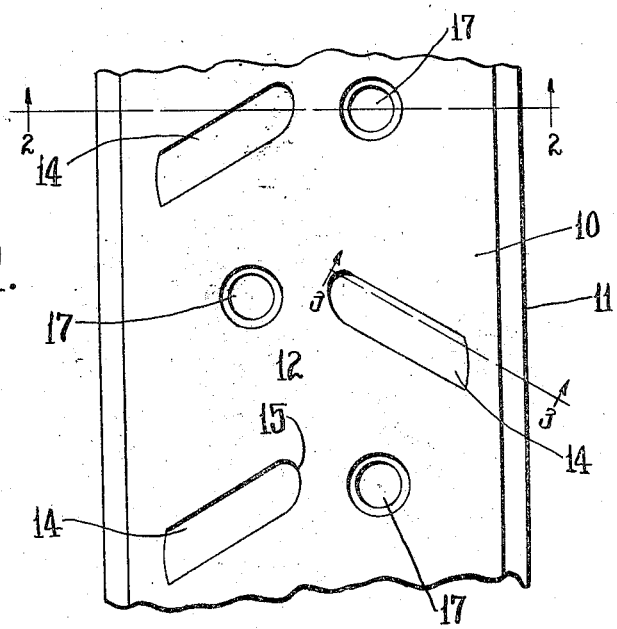
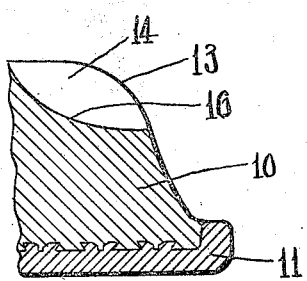
INVENTOR
Myron R. Shaw.
BY
ATTORNEY Patented Oct. 16, 1923.

1,471,070

UNITED STATES PATENT OFFICE.

MYRON R. SHAW, OF SPRINGFIELD, MASSACHUSETTS, ASSIGNOR TO THE FISK RUBBER COMPANY, OF CHICOPEE FALLS, MASSACHUSETTS, A CORPORATION OF MASSACHUSETTS.

RUBBER TIRE.

Application filed October 26, 1920. Serial No. 419,572.

*To all whom it may concern:*

Be it known that I, MYRON R. SHAW, a citizen of the United States of America, residing at Springfield, in the county of Hampden and State of Massachusetts, have invented certain new and useful Improvements in a Rubber Tire, of which the following is a specification.

My invention relates to rubber tires of the solid or cushion type, and has for its object a tire of this type in which the resiliency, wearing qualities and tractive effectiveness are substantially improved.

The most generally satisfactory solid tires have been those of substantially trapezoidal cross-section which for the most part have been made with a plain surface. Of course, tires so constructed have no cushion effect except that which is due to the natural resiliency of the rubber itself. It has been proposed to increase the resiliency of these tires and to break up what is known as the traction wave by providing either straight recesses cut in the side or cylindrical holes located at an angle to the radius of the tire. By the term "traction wave" it will be understood that I refer to the wave of compression of the rubber which is set up just ahead of the line of contact of the tire with the ground, the rubber having a tendency to pile up at this point. Considerable trouble has been experienced with tires built with straight recesses largely on account of excessive wear on the rubber adjacent the recesses. This is due to the fact that a straight recess meets and leaves the road instantaneously throughout its whole length. As the rubber is under compression when in contact with the road there is a considerable snap when it is released by the recess coming into position which causes greatly increased friction and wear in the tire. Furthermore if a sufficient number of straight recesses are provided to break up the traction wave the tire is weakened and is unable to stand road conditions without excessive wear. The cylindrical holes which have been proposed soon become useless on account of their collecting dirt and stones.

By my improved construction I avoid these difficulties and provide a tire having greatly improved qualities of resiliency, wear and tractive effectiveness.

My invention can best be appreciated when considered in connection with its illustration in the accompanying drawings, in which—

Fig. 1 is a fragmentary plan of the tread portion of my improved tire;

Fig. 2 is a section on line 2—2 of Fig. 1; and

Fig. 3 is a section on line 3—3 of Fig. 1.

The tire is formed of a rubber body 10 mounted in any suitable way on a metal base 11, as by a layer of hard rubber adjacent the metal. The tread portion 12 of the tire is preferably substantially flat but slightly rounded as at 13 at its edges. Recesses or grooves 14 are formed in the sides of the tire, being preferably arranged obliquely to the central line or plane of the tire, and being preferably rounded in cross-section at their bottom as at 15 and curved in longitudinal section as at 16, so that abrupt corners are avoided and the grooves will have a contour tending to free them of stones and dirt. This action will be aided by the oblique arrangement of the grooves, the progressive compression of the rubber and consequent narrowing of the grooves forcing out any foreign matter such as dirt, and the widening of the grooves after the compression is removed releasing stones or the like which have been picked up. These recesses are preferably arranged alternately on the two sides of the tire, so as not to remove a large volume of rubber at any one line of cross-section, and extend to substantially the center of the tire from points part way down the sides. Between the recesses 14 are recesses or depressions 17 confined within the tread portion and preferably substantially frusto-conical in form. These latter recesses are preferably disposed non-centrally of the tread, so that they break up the rubber volume in the roughly diamond-shaped portion of the tire between the recesses 14. Both sets of recesses are preferably arranged to extend a material distance into the tire, preferably to a depth within the middle third of the tire. In other words, considering the section as shown in Fig. 2 divided by horizontal lines into three parts of equal depth, the recesses are preferably of such a depth as to extend approximately within the central one of the three areas so formed.

A tire constructed as above described has numerous advantages in manufacture and operation over tires now in use. For example the oblique direction of the recesses 14 gives a much better action on the road than is the case with recesses set at right angles to the center line of the tire, due to the contact of the recess with the road being gradual and progressive instead of sudden as is the case with tires having straight recesses, as described above. The conical holes serve to break up the continuity of the rubber between the side recesses, and provide space for the compression of the rubber. Due to their conical shape they act to expel any stones or dirt that may be picked up, the collection of which forms a troublesome feature of tires having cylindrical holes. The depth of the two sets of recesses both serves to aid in supplying a uniform heat to the whole volume of the tire in vulcanization and to ventilate the base of the tire when in road use, thus avoiding overheating of the tire at this point.

By the construction above described a tire is provided having a substantially flat tread portion with recesses therein so disposed as to provide ample breaking up of the flowage of the rubber in all directions, and at the same time without weakening the tire or causing excessive wear. It will be noted that at any line of cross-section there is comparatively little rubber removed, or, in other words, there is at all times a large area of rubber presented to the ground.

Having thus described my invention, I claim:

1. A solid rubber tire having a resilient body portion, recesses oblique to the plane of the tire and arranged on opposite sides thereof, and substantially conical recesses disposed non-centrally of the tread portion of the tire and between the first-named recesses; the said recesses extending to a depth approximately within the middle third of the tire.

2. A solid rubber tire having an annular body portion of resilient material of substantially trapezoidal cross-section, recesses oblique to the plane of the annulus and extending alternately from the sides of the tire to substantially the center of the tread, and substantially conical recesses disposed to break the continuity of the surface between adjacent recesses on the same side of the tire, the said recesses extending to a depth approximately within the middle third of the tire.

3. A solid rubber tire having an annular body portion of resilient material, recesses extending alternately into the tread portion of the tire from opposite sides of the tire, and additional recesses confined within the tread portion and arranged to break the continuity of the tread surface between adjacent side recesses, the said recesses extending to a depth approximately within the middle third of the tire.

4. A solid rubber tire having an annular body portion of resilient material forming a generally flat tread surface, grooves extending into the outer surface of the annulus from opposite sides thereof, and substantially conical depressions disposed non-centrally of the annulus and located between the grooves, the said grooves and depressions extending to a depth approximately within the middle third of the tire.

5. A solid rubber tire having a substantially trapezoidal cross-section and presenting a tread surface which is substantially flat but having rounded corners, grooves extending from the sides of the tire to substantially the center of the tread, said grooves being disposed obliquely to the center line of the tread and being curved in longitudinal section and rounded in cross-section at their bottoms, said grooves also being arranged alternately on opposite sides of the tire, and depressions substantially frusto-conical in form located non-centrally of the tread portion between adjacent grooves on the same side of the tire, the said grooves and depressions extending to a depth approximately within the middle third of the tire.

MYRON R. SHAW.